(12) United States Patent
Mistry

(10) Patent No.: US 9,777,882 B2
(45) Date of Patent: Oct. 3, 2017

(54) SKELETON BASE FOR A COMPRESSOR SYSTEM

(71) Applicant: Ingersoll-Rand Company, Davidson, NC (US)

(72) Inventor: Ritesh Kumar Mistry, Gujarat (IN)

(73) Assignee: Ingersoll-Rand Company, Davidson, NC (US)

( * ) Notice: Subject to any disclaimer, the term of this patent is extended or adjusted under 35 U.S.C. 154(b) by 0 days.

(21) Appl. No.: 14/957,740

(22) Filed: Dec. 3, 2015

(65) Prior Publication Data

US 2017/0159872 A1 Jun. 8, 2017

(51) Int. Cl.
| | |
|---|---|
| *F16M 5/00* | (2006.01) |
| *F16M 1/02* | (2006.01) |
| *F01D 25/28* | (2006.01) |
| *F04B 35/00* | (2006.01) |
| *F04B 35/04* | (2006.01) |
| *F04C 29/00* | (2006.01) |
| *F04D 25/04* | (2006.01) |
| *F04D 25/06* | (2006.01) |
| *F04D 29/58* | (2006.01) |
| *F04C 29/04* | (2006.01) |
| *F04B 39/06* | (2006.01) |

(52) U.S. Cl.
CPC ............... *F16M 5/00* (2013.01); *F01D 25/28* (2013.01); *F04B 35/002* (2013.01); *F04B 35/04* (2013.01); *F04B 39/06* (2013.01); *F04C 29/0085* (2013.01); *F04C 29/04* (2013.01); *F04C 2240/40* (2013.01); *F04D 25/045* (2013.01); *F04D 25/06* (2013.01); *F04D 29/582* (2013.01); *F16M 1/02* (2013.01)

(58) Field of Classification Search
CPC ........ F01C 21/007; F04B 35/06; F04B 39/06; F04B 39/14; F04C 29/04; F04C 2230/60; F04C 2230/604; F04D 29/5826; F04D 29/5833; F04D 17/12; F04D 25/02; F04D 25/163; F04D 29/601; F05D 2260/211; F01D 25/28; F16M 5/00; F16M 1/02
USPC ........... 248/676–678, 637, 639, 646; 60/791, 60/797
See application file for complete search history.

(56) References Cited

U.S. PATENT DOCUMENTS

| | | | |
|---|---|---|---|
| 1,716,132 A * | 6/1929 | Hodgkinson | ........... F01D 25/28 248/678 |
| 4,099,905 A * | 7/1978 | Nash | ................... B29C 45/1761 425/542 |
| 4,191,356 A * | 3/1980 | Ashmun | ................. F01D 25/28 248/678 |
| 4,572,474 A | 2/1986 | Derlich | |
| 5,626,468 A | 5/1997 | Muir et al. | |

(Continued)

*Primary Examiner* — Tan Le
(74) *Attorney, Agent, or Firm* — Taft Stettinius & Hollister LLP

(57) ABSTRACT

A compressor system is disclosed with a skeleton base structure configured to support a compressor. The skeleton base includes a first portion and a second portion configured to support the compressor system. The first portion includes a lower elongate support leg extending along a longitudinal direction, a support platform spaced above the lower support leg, and an open space formed between the lower support leg and the support platform. The second portion includes an extension beam projecting along the longitudinal direction from the first portion and a cross member support positioned transversely across the extension beam.

13 Claims, 4 Drawing Sheets

(56) References Cited

U.S. PATENT DOCUMENTS

| | | |
|---|---|---|
| 7,191,792 B2 | 3/2007 | Hendrix |
| 7,546,742 B2* | 6/2009 | Wakeman ............ F01D 25/162 |
| | | 60/791 |
| 8,047,809 B2 | 11/2011 | Wickert et al. |
| 8,167,584 B2 | 5/2012 | Pyke et al. |
| 8,511,981 B2 | 8/2013 | Small et al. |
| 9,366,268 B2* | 6/2016 | Maier ................... F04D 29/601 |
| 2010/0162726 A1* | 7/2010 | Robertson ............ F01D 25/285 |
| | | 60/797 |
| 2013/0078118 A1 | 3/2013 | Maier et al. |
| 2015/0330409 A1* | 11/2015 | Mistry ................ F04D 29/5833 |
| | | 417/53 |

* cited by examiner

SKELETON BASE FOR A COMPRESSOR SYSTEM

TECHNICAL FIELD

The present application generally relates to a base for industrial air compressor systems and more particularly, but not exclusively, to a skeleton base to permit a variety of compressor subsystems to be connected thereto.

BACKGROUND

Large industrial compressor systems can have complex designs, assembly and maintenance procedures. Typically, compressor systems are built with a base frame that support air end and drive system assemblies. Prior base frames often times required a special foundation to adjust for height differences between the compressor and other subsystems such as heat exchange systems or the like. When designed for a one-off system, base frames can be expensive to manufacture and can sometimes cause difficulties with installation and maintenance. Some existing systems have various shortcomings relative to certain applications. Accordingly, there remains a need for further contributions in this area of technology.

SUMMARY

One embodiment of the present invention is a compressor system with a unique skeleton base configured to support a plurality of system modules. Other embodiments include apparatuses, systems, devices, hardware, methods, and combinations for compressor systems with a unique skeleton base. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
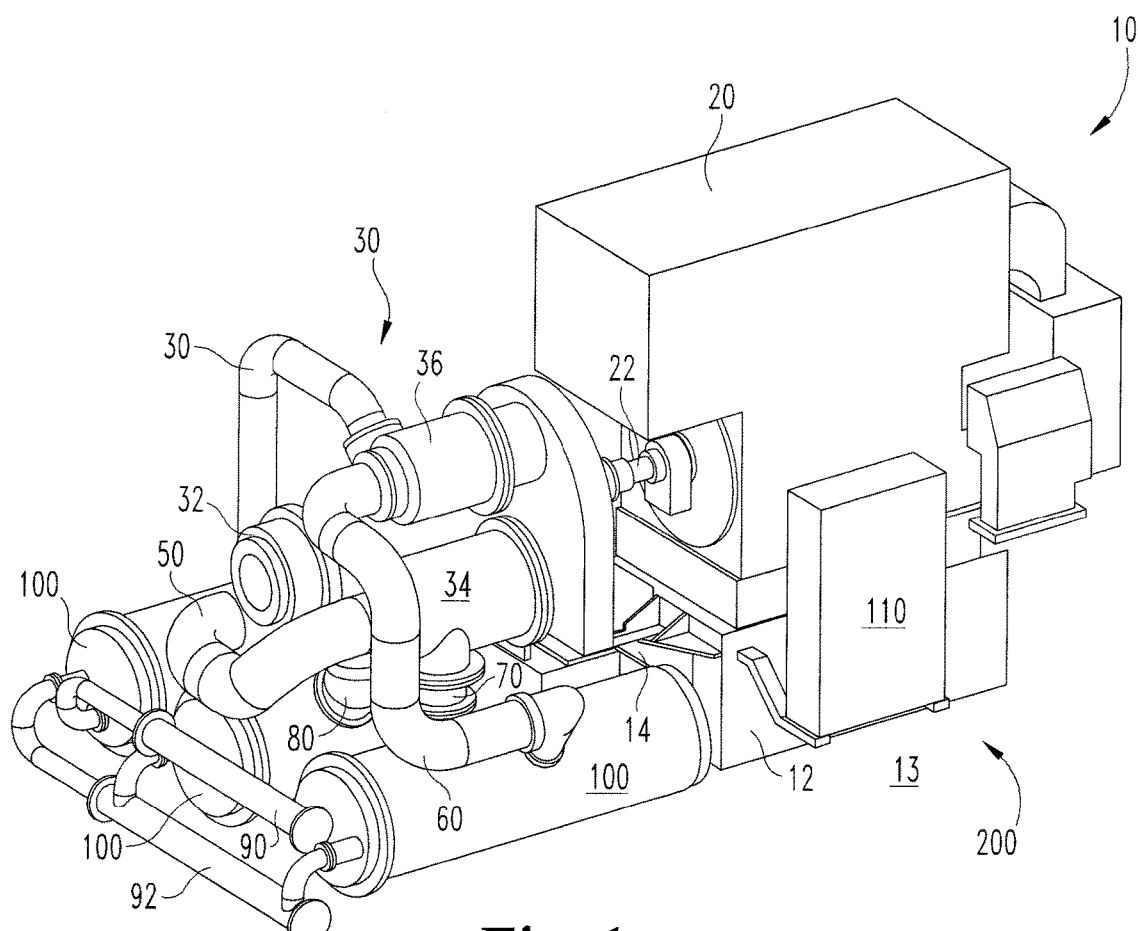
FIGS. 1 and 2 show perspective views of a compressor system according to one embodiment of the present disclosure.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Industrial compressor systems can have many large and complex features such as external fluid to fluid heat exchangers or intercoolers, a motive source to drive the compressors and a lubrication system to supply lubrication fluid to system components as required. Large compressor systems typically have a main base or support structure to support the compressor system components during operation. Some base support structures have lubrication systems with built in oil reservoirs specifically designed for individual or distinct compressor systems. The lubrication system typically includes a reservoir for holding lubricating fluid such as oil, one or more fluid conduits connected to the reservoir and pumps for drawing oil from the reservoir and delivering the oil to defined locations in the system. Other systems such as intercoolers, pumps, controllers as well as other compressor system components can be positioned on the base support structures. The present disclosure provides a skeleton base to facilitate support of different compressor system modules, various components, and different types or sizes of compressor systems so as to provide flexibility in the system design and reduce weight and design complexity of the base support structure.

Figure 2:
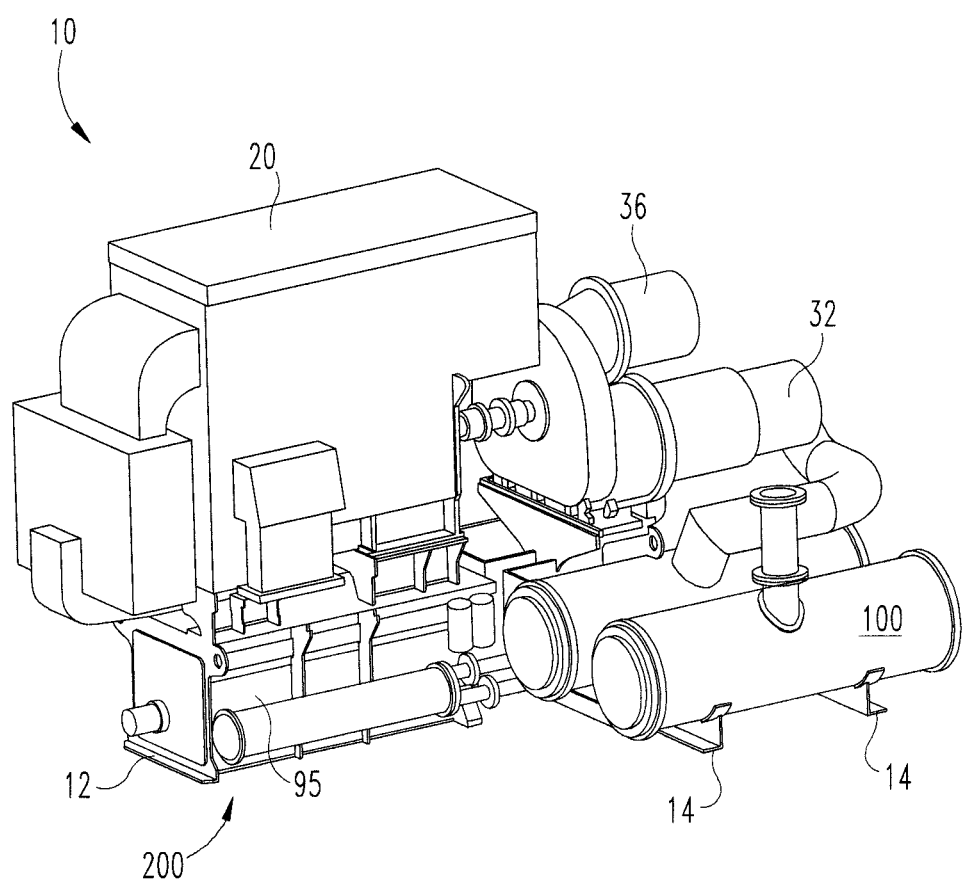

Referring now to FIGS. 1 and 2, an exemplary compressor system 10 is shown in perspective views therein. The compressor system 10 includes a primary motive source 20 such as an electric motor, an internal combustion engine or a fluid-driven turbine and the like. The compressor system 10 can include a compressor 30 with multi-stage compression and in the exemplary embodiment includes a first stage compressor 32, a second stage compressor 34, and a third stage compressor 36. In other embodiments a different number of compressor stages may be employed with the compressor 30. The compressor 30 can include centrifugal, axial and/or positive displacement compression means. The primary motive source 20 is operable for driving the compressor 30 via a drive shaft 22 to compress fluids such as air or the like. The term "fluid" should be understood to include any gas or liquid medium that can be used in a compressor system as disclosed herein.

A structural base 12 including a skeleton base support 200 is configured to support at least portions of the compressor system 10 on a support surface 13 such as a floor or ground and the like. One or more extensions or arms 14 can extend from the base 12 and is configured to hold portions of the compressor system 10. Portions of the compressed air discharged from the compressor 30 can be transported through more one or more conduits 40, 50, 60, 70 and 80 to one or more intercoolers 100 and/or to another compressor stage. An inlet fluid manifold 90 and an outlet fluid manifold 92 can be fluidly connected to the intercoolers 100 to provide cooling fluid such as water or other liquid coolant to cool the compressed air after discharge from one or more of the compressor stages of the compressor 30. A portion of the compressor system such as an oil sump 95 may be positioned within an open region formed in the skeleton base support 200. The compressor system 10 can also include a controller 110 operable for controlling the primary motive power source and various valving and fluid control mechanisms (not shown) between the compressor 30 and intercoolers 100.

Figure 3:
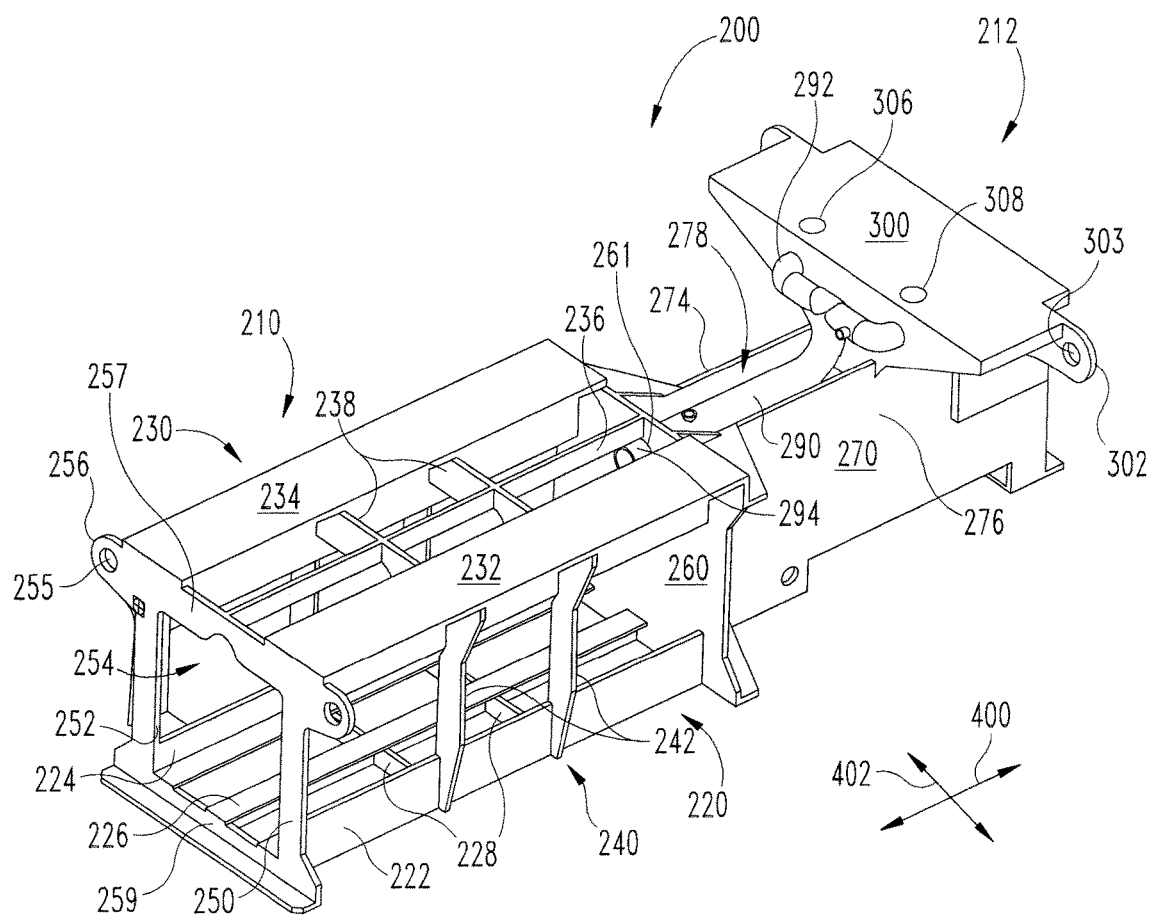
FIGS. 3 and 4 show perspective views of a skeleton base for a compressor system.
Figure 4:
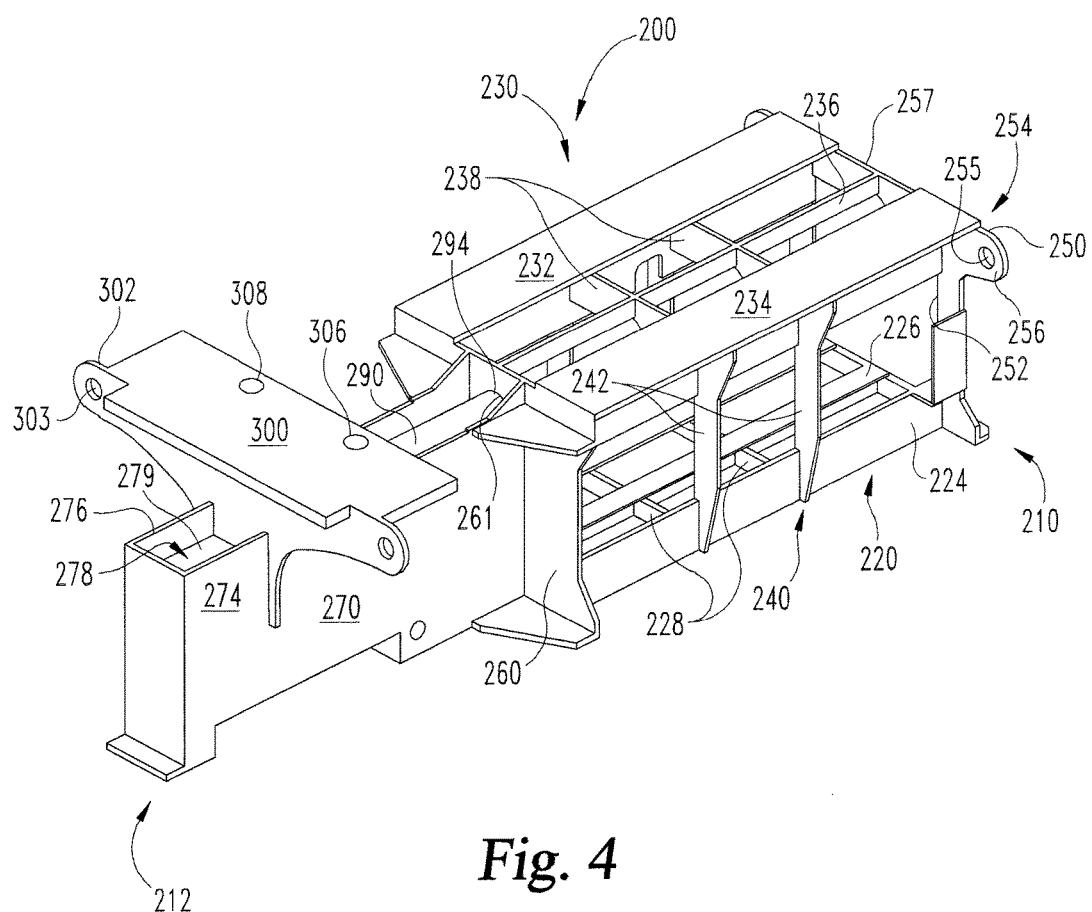

Referring now to FIGS. 3 and 4, a skeleton base support 200 for a compressor system is illustrated therein. The skeleton base support 200 includes a first portion 210 and a second portion 212. The first portion 210 includes a lower elongate support leg 220 and in some forms may include a plurality of lower elongate support legs 220. In the exemplary embodiment, the lower elongate support leg 220 includes a first lower elongate support leg 222 and a second lower elongate support leg 224 and one or more intermediate elongate support legs 226. The first portion 210 may also include one or more support leg tie members 228 connecting each of the lower elongate support legs to one another. The first portion 210 of the skeleton base structure 200 can also include a support platform 230 for receiving and supporting a portion of the compressor system. By way of example and not limitation, a motive portion of the compressor system can be positioned proximate the support platform. The support platform 230 can include one or more support platform members and in the exemplary disclosed embodiment includes a first support platform member 232 and a second support platform member 234. One or more intermediate support platform members 236 can be disposed between the first and second support platform members 232, 234 respectively. One or more support platform tie members 238 can extend between and connect the support platform members 232, 234 so as to provide increased stiffness and structural support thereto.

A rib structure 240 can extend between the lower elongate support leg 220 and the support platform 230 to provide a space therebetween and provide structural support to withstand the weight of portions of the compressor system 10. Rib structure 240 can include one or more ribs 242 extending therebetween and in the disclosed embodiment includes first and second ribs 242 disposed on either side of the first portion 210. The first portion 210 also includes an aft wall 250 having an opening 252 formed therein. The opening 252 provides egress to an open space 254 formed in the first portion 210 between the lower elongate support leg 220 and the support platform 230. The aft wall 250 can include one or more ears 256 with a throughhole 255 formed therein which are configured to receive an attachment feature for a compressor system lift mechanism or the like. The aft wall 250 can include an upper transverse tie member 257 extending between the first and second support platform members 232, 234 and a lower transverse tie member 259 extending between the first and second lower support legs 222, 224.

A forward wall 260 is formed between the first portion 210 and the second portion 212 so as to separate the portions and provide a connection location for the second portion 212 to extend therefrom. An extension beam 270 extends from the forward wall 260 and can include a first sidewall 274 on one side and a second sidewall 276 on the other side to form a cavity 278 therebetween. The top of the sidewalls 274, 276 can be raised above a floor 279 to define wall boundaries of the cavity 278. One or more conduits 290 can be connected between the first and second portions 210 and 212 to provide a flow path for fluid such as oil, coolant or fuel flow and the like. In the exemplary embodiment the conduit 290 can extend from a first end 292 to a second end 294 connected between the first and second portions 210, 212 of the skeleton base 200. In one form an aperture 261 can be formed in the forward wall 260 to receive the second end 294 of the conduit 290.

A cross member support 300 can extend transversely across the extension beam 270 to provide a platform for holding a portion of the compressor system 10. In one form the cross member 300 can be cantilevered over one or both sides of the extension beam 270. The cross member support 300 can include an eyelet or ear 302 with a throughhole 303 constructed to provide an attachment feature for receiving and holding onto the portion of the compressor system and/or a lift mechanism (not shown). The cross member 300 can also include one or more through apertures formed therein such as apertures 306 and 308 illustrated in the exemplary embodiment. The apertures 306, 308 can form fluid passageways through the cross member to connect in fluid communication with the fluid conduit 290. For clarity, a longitudinal direction can be defined by double arrow 400 and lateral or transverse direction can be defined by double arrow 402 as depicted in the exemplary embodiment of FIG. 3.

In operation a compressor system can be installed, assembled or otherwise supported by a skeleton base as defined herein. The skeleton base may be formed from or with any technique as one skilled in the art could conceive. For example, portions of the skeleton base can be welded, brazed, machined, connected with mechanical fasteners, and formed from casting or forging materials. The skeleton base can be formed as a standard relatively light weight platform for which a variety of compressor designs and configurations. Upon installation onto the skeleton base, the compressor system is configured to provide compressed air at a desired temperature and pressure to external systems. The compressor system can be used in any industrial application including but not limited to automobile manufacturing, textile manufacturing, process industries, refineries, power plants, mining, material handling, etc. The controller permits user input to define parameters such as pressure, temperature and mass flow rate. The controller will send command signals to the motor to rotate at a desired operating speed in order to drive the one or more compressors and control various valving to control airflow rate, coolant flow rate and/or lubrication flow rates.

In the illustrative example, the compressor system includes a three-stage centrifugal compressor system, however, the system can operate with other types of compressors and/or with more or less stages of compressors. In some embodiments one or more intercoolers can be fluidly coupled to each compressor stage such that after air is compressed through the first stage the air can be transported through a first intercooler and can be cooled to a desired temperature via a heat transfer mechanism such as conduction and convection in tube type heat exchangers.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:
1. A base for a compressor system comprising:
   a first portion defined between a forward wall and an aft wall, the first portion including:
      a pair of lower elongate support legs spaced apart from one another and extending along a longitudinal direction;
      a support platform spaced apart from and above the lower support legs;

a rib extending between the lower support legs and the support platform; and an open space having a height defined between the lower support legs and the support platform, a width defined between the lower support legs, and a length defined between the forward and aft walls;

an opening formed though the aft wall defined by an area sized to correspond with a size of a cross sectional area of the open space; and a second portion extending from the forward wall of the first portion, the second portion including:

an extension beam projecting along the longitudinal direction; and a cross member support positioned transversely across the extension beam.

2. The base of claim 1, further comprising a fluid conduit connected between the first portion and the second portion of the base.

3. The base of claim 2, wherein the fluid conduit is a substantially rigid member positioned at least partially within a cavity defined by raised opposing sidewalls of the extension beam and is fluidly coupled to an aperture formed in the cross member and an aperture formed in the second portion.

4. The base of claim 1, wherein a width of the cross member is greater than a width of the extension beam in a lateral direction.

5. The base of claim 1, further comprising a lower support leg tie member extending between the pair of lower support legs.

6. The base of claim 1, wherein the support platform includes a least two platform members spaced apart from one another in a lateral direction.

7. The base of claim 1, wherein the aft wall further includes an upper transverse tie member and a lower transverse tie member extending in a lateral direction adjacent the support platform and the lower support legs respectively.

8. The base of claim 1, further comprising:

a first ear projecting outward from one of the support platform members and a second ear projecting outward from the cross member support; and an aperture extending through each of the first and second ears.

9. The base of claim 1, wherein the forward wall includes an aperture to define a passageway in communication with the open space.

10. A base for a compressor system comprising:

a first portion defined between a forward wall and an aft wall configured to support a motive source for the compressor, the first portion including:

a pair of lower elongate support legs extending along a longitudinal direction and spaced apart from one another in a lateral direction;

a pair of support platform members extending along the longitudinal direction spaced apart from one another in the lateral direction and positioned above the lower support legs;

an open space formed between the lower support legs and the support platform members and between the forward and aft walls, the open space sized to receive a removable fluid reservoir through an opening formed in the aft wall;

a rib extending between the lower support legs and the support platform members;

a lower transverse tie member extending between the pair of support legs; and an upper transverse tie leg extending between the pair of platform members; and a second portion extending from the first portion of the base, the second portion including:

an extension beam projecting along the longitudinal direction;

a cross member support positioned transversely across the extension beam such that a portion of the cross member is cantilevered over a side of the extension beam; and a fluid conduit coupled between an aperture formed in the cross member and an aperture formed in the forward wall of the first portion.

11. A base for a compressor system comprising:

a lower elongate support leg extending along a longitudinal direction;

a support platform spaced above the lower support leg;

at least one rib extending between the lower support leg and the support platform;

an extension beam projecting from lower elongate support leg along the longitudinal direction; and a cross member support connected to the extension beam, wherein a portion of the cross member is cantilevered over a side of the extension beam;

an aperture formed through the cross member support configured to convey a fluid therethrough;

an open space formed between the lower support leg and the support platform;

a fluid reservoir is positionable within the open space;

a fluid conduit fluidly connecting the aperture of the cross member to the fluid reservoir;

a rib extending between the lower support leg and the support platform;

a lower transverse tie member extending between the pair of support legs;

an intermediate elongate support leg positioned between the pair of elongate support legs;

an upper transverse tie member extending between the two platform support members; and an intermediate elongate support member positioned between the two platform support members.

12. The base of claim 11, wherein the elongate support leg includes a pair of elongate support legs spaced apart in a lateral direction.

13. The base of claim 11, wherein the support platform includes two platform support members spaced apart from one another and extending along the longitudinal direction.

\* \* \* \* \*